Patented Feb. 23, 1932

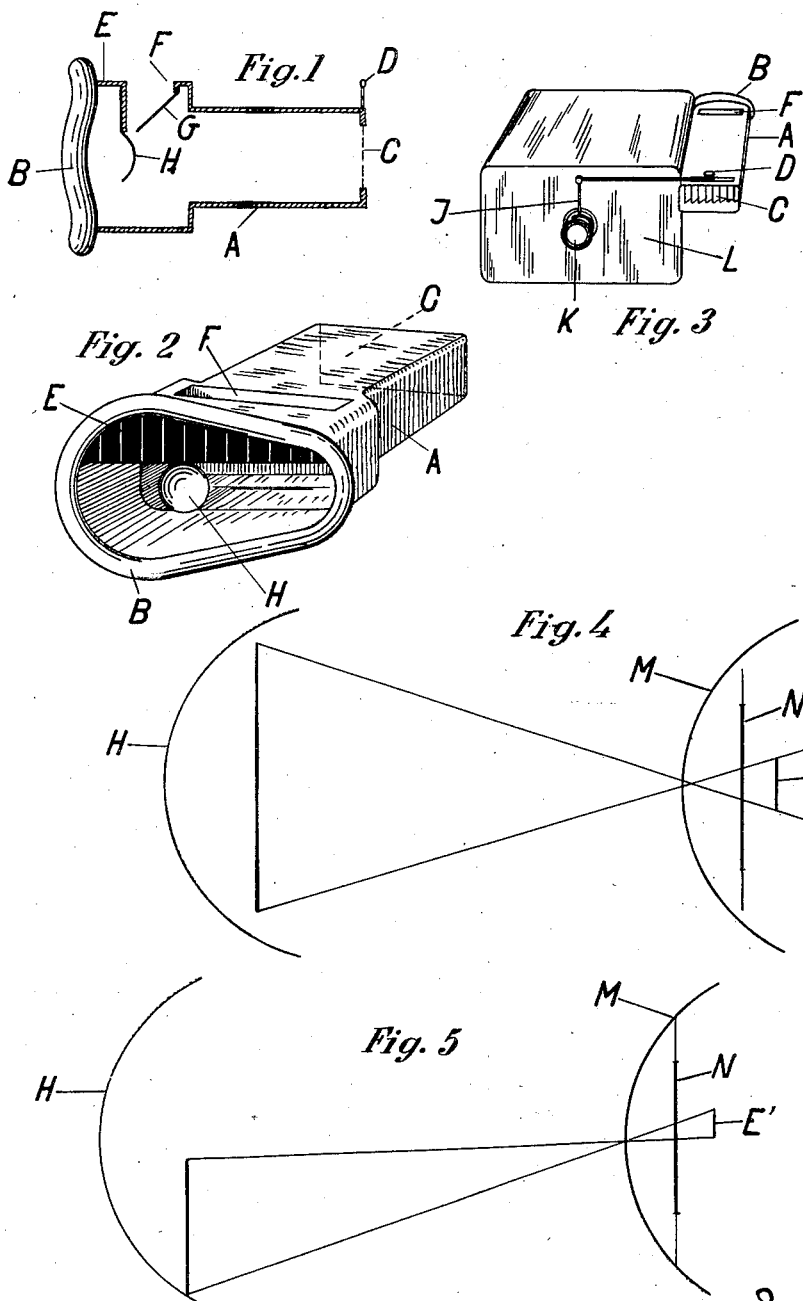

1,846,486

UNITED STATES PATENT OFFICE

GERD HEYMER, OF DESSAU-ZIEBIGK IN ANHALT, GERMANY, ASSIGNOR TO AGFA ANSCO CORPORATION, OF BINGHAMTON, NEW YORK, A CORPORATION OF NEW YORK

EXPOSURE-METER FOR PHOTOGRAPHIC PURPOSES

Application filed May 13, 1930, Serial No. 452,054, and in Germany May 23, 1929.

My present invention relates to an exposure-meter for photographic purposes.

As is known, the diameter of the pupil of the human eye changes in inverse ratio to the quantity of the light incident thereon. Various attempts have hitherto been made to use this fact for determining what the duration of photographic exposures should be. Nevertheless, this process has not attained any practical importance primarily because in the devices proposed for this purpose the scale from which the diameter of the pupil is to be read, cannot be brought in one plane with the reflected image of the pupil so that in making the measurement the eye must constantly be focussed to different distances.

According to this invention, the said inconvenience is remedied by an arrangement in which the reflected image of the pupil of the eye is compared with the very reduced image of a suitably adapted scale reflected from the front surface of the eye, instead of being compared directly with a scale carried on the mirror. By this method, it becomes possible to make the virtual image of the scale reflected from the surface of the eye coincide with the plane of the pupil of the eye by placing the scale at a suitable distance from the eye. But this is not absolutely necessary for the reason that in the new method even without very exact positioning of the scale the plane of the virtual picture of the latter lies always relatively near the plane of the pupil.

In determining the duration of the exposure one may also proceed in such a way that by intercepting part of the light proceeding from the object whose brightness is to be estimated and entering the eye, the pupil is adjusted to an arbitrarily fixed diameter.

The most simple device for applying this invention consists in a concave mirror and a line-scale arranged in proximity thereto. Of course, numerous modifications of the device are possible. Thus, for instance, the concave mirror can be placed within a tube, the aperture of which is adjusted in such a manner that it just embraces the area of the picture the time of exposure of which is to be determined. The concave mirror is chosen as small as possible in order to hide a portion of the picture area as small as possible. The scale arranged above or below the concave mirror is preferably provided with white lines on a black ground for the reason that the edge of the pupil can be more easily recognized in the mirror, when the front surface of the eye is reflecting a dark surface. Since the quantity of light entering the exposure-meter is in many cases very small, it is advisable to provide a separate illumination for the scale; this may, for instance, consist of a mirror reflecting the light of the sky on the scale. The scale may be subdivided in any desired manner. The lines of the scale may, for instance, denote the diameter of the pupil in the unit of length; alternatively the scale may also be calibrated with respect to the durations of exposure corresponding with the different diameters of the pupil.

If the device is to be utilized in such a manner that by interception of part of the incident light proceeding from the object the brightness of which is to be estimated, diameter of the pupil is to be brought to a constant value, the scale may be dispensed with and merely two lines or a circle indicating said value may be adopted. The incident light is in this case stopped down by the arrangement of an adjustable diaphragm whose adjustment constitutes in each case a measure of the duration of exposure required.

The exposure-meter operating in the last described manner may be fixed directly to the photographic or motion picture camera and be so constructed that the diaphragm of the camera is controlled by the diaphragm of the exposure-meter. In this way, the alteration of the diaphragm of the exposure-meter effects at the same time a corresponding stopping device of the view-taking objective.

My invention may be illustrated by the accompanying drawings.

Fig. 1 is a side view of an embodiment of my invention partly in section.

Fig. 2 is a perspective view of the exposure-meter with opened front and

Fig. 3 shows a photographic or cinematographic apparatus combined with an exposure-meter constructed according to my invention. The same reference characters used in the different figures indicate the same parts.

Figs. 4 and 5 are sectional views in vertical and horizontal directions respectively.

In Figs. 1 and 2 A is a casing open on both ends and provided on one end with a padded flange B covered with velvet, and on the other end with a diaphragm C, for instance, an iris diaphragm or a lamella diaphragm adjustable by a lever D. Near to the end of the casing provided with the padded flange and faced to the eye when in operative position, a scale E is fixed on a projection vertically to the longitudinal axis of the casing. This scale, preferably, consists of a black ground provided with white or light transmitting gradations. Behind the scale an opening F is cut out from the casing in which an inclined mirror G is placed thus illuminating the scale E from behind by the reflected daylight or by an artificial illumination, since the illumination through the diaphragm opening on the rear side of the casing, generally, is unsufficient for an exact determination. On the base of the scale E a concave mirror H is arranged with its front directed to the front opening of the casing.

The exposure-meter operates as follows:

The end of the casing bearing the diaphragm C is directed to the object from which a picture is to be taken, and the padded flange B is placed before the eye of the photographer, so that this opening of the casing is nearly light-tightly closed by the velvet coating. Now, an image of the eye and simultaneously a virtual image of the scale reflected by the pupil is seen in the concave mirror, and the diameter of the pupil can be directly measured on the reflected scale. By a suitable graduation of the scale, the duration of the exposure may be read off directly from the reflected image of the scale. Or, the diameter of the pupil may be brought to a constant value by a suitable adjustment of the diaphragm C controlling the intensity of incident light. In this case the duration of exposure may be seen from the position of the adjusting lever D of the diaphragm. Finally, the adjusting device D of the diaphragm may control directly the adjusting device of the diaphragm placed in the objective of the camera or the speed adjustment of the instantaneous shutter of the latter. This embodiment of my invention is shown in Fig. 3. The casing A of the exposure-meter is fastly attached to the camera. The diaphragm C is operated by the handle D which simultaneously operates the adjusting lever I of the objective K or of the shutter of the camera L.

The optical relations in my exposure-meter may be explained with reference to Figures 4 and 5 which are sectional views in vertical and horizontal direction. M is the reflecting surface of the eye of the observer opposite to the concave mirror H, and N is the pupil. By the reflecting surface M of the eye a virtual image E' of the scale E is projected being nearly in the same plane as the pupil N. The pupil N and the virtual image E' of the scale are viewed strongly magnified from the observer simultaneously in the concave mirror H and thus may be compared. Thus, it is possible to view the pupil and the image of the scale simultaneously in perfect definition.

What I claim is:—

1. An exposure-meter for photographic purposes comprising a casing with two apertures, at one aperture a padded flange to be brought into intimate contact with the eye of the observer, near said aperture a concave mirror, a light translucent scale arranged in the proximity thereof, behind said scale an opening in the said casing provided with an inclined mirror to illuminate the scale, and at the other aperture of the casing an adjustable diaphragm.

2. A photographic apparatus with an adjustable objective combined with an exposure-meter as claimed in claim 1, wherein the diaphragm adjusting device of the exposure-meter operates simultaneously the adjustment of the camera.

In testimony whereof, I affix my signature.

GERD HEYMER.